April 29, 1930.  L. J. THOMAS  1,756,768
PISTON
Filed Sept. 23, 1927
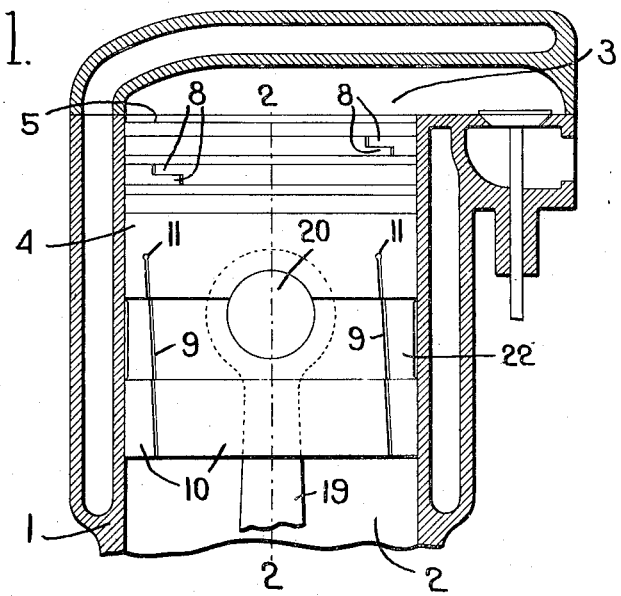
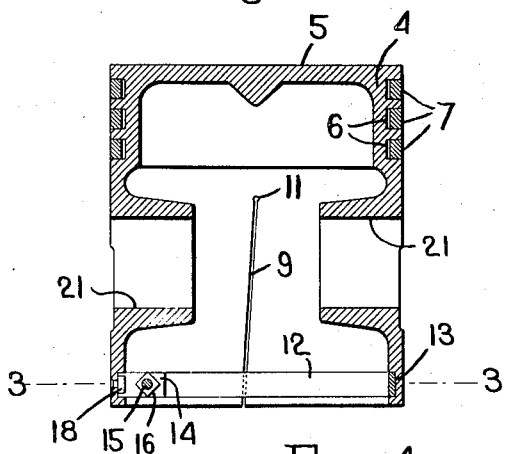
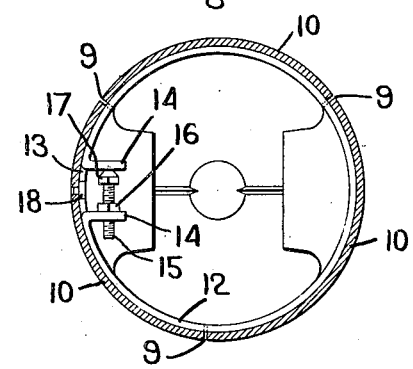
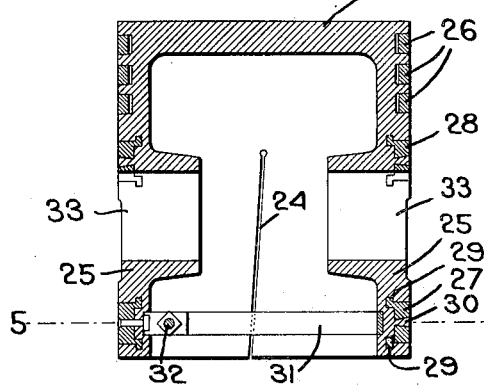
Inventor.
Leslie J. Thomas
by Heard Smith & Tennant.
Attys.

Patented Apr. 29, 1930

1,756,768

UNITED STATES PATENT OFFICE

LESLIE J. THOMAS, OF ARLINGTON HEIGHTS, MASSACHUSETTS, ASSIGNOR TO VERA C. BATCHELDER, OF ARLINGTON HEIGHTS, MASSACHUSETTS

PISTON

Application filed September 23, 1927. Serial No. 221,498.

This invention relates to a piston which has a relative reciprocation with respect to a cylinder wherein it is essential that the piston shall be as light as possible and wherein it is essential that a close fit shall be maintained between the piston periphery and the cylinder wall. Such a piston is particularly useful in the hydrocarbon explosion engine wherein compression is high, the piston travel is rapid and lubrication must be maintained.

One object of the invention is to provide a piston which is formed chiefly of aluminum whereby the desired light weight is obtained and in which one or more hard metal rings are embedded in the aluminum and present hard bearing surfaces at the piston periphery to take the wear. There is thus presented a piston having the desirable qualities of light weight associated with a soft, light metal and at the same time the desirable qualities of high resistances to wear associated with a hard metal.

The object of the invention is further to provide a construction of piston in which the cylindrical wall or skirt integral with the piston head is formed into a plurality of segments and in which means are provided at the free ends of these segments to adjust the diameter thereof so as to enable a close fit to be maintained with the cylinder, thus preventing piston "slap" and insuring uniform wear both of the piston and cylinder. This feature of the invention is not limited to the aluminum type of piston which, as already pointed out, constitutes one feature of the invention.

The nature and objects of the invention will appear more fully from the accompanying description and drawings and will be particularly pointed out in the claims.

In the drawings:

Fig. 1 is a view of a portion of the cylinder and piston of an ordinary type of hydrocarbon explosion engine with the cylinders shown in cross section and the piston in side elevation and embodying one form of the present invention.

Fig. 2 is a view in axial cross section taken on the line 2—2 of the piston construction shown in Fig. 1.

Fig. 3 is a view in transverse cross section taken on the line 3—3 of the piston construction shown in Fig. 2.

Fig. 4 is a view similar to Fig. 2 of a piston embodying another form of the invention.

Fig. 5 is a partial transverse cross section taken on the line 5—5 of the construction shown in Fig. 4.

There is shown in Fig. 1 a portion of a simple type of hydrocarbon engine having the cylinder 1 presenting the cylindrical wall or surface 2 to cooperate with the piston and having an explosion chamber 3 to which the hydrocarbon mixture is fed and from which it expands to propel the piston in its power stroke. But it will be understood that this particular type of motor selected is simply for the purpose of illustrating preferred embodiments of the invention which in their broader aspects are available for embodiment in any piston wherein a tight fit must be maintained between the piston and the cooperating cylinder wall.

The piston in the form illustrated in Figs. 1, 2 and 3 comprises, first, a solid head against which the pressure is exerted to effect movement of the piston and, second, a cylindrical skirt integral with the head. The piston body thus formed of the head and skirt may be in one aspect of the invention of any suitable metal, such, for example, as cast iron, commonly employed in cylinder construction. The cylindrical skirt is divided into a plurality of segments and means are provided for adjusting these segments at their free ends radially so as to maintain a tight fit between the segments and the cylinder wall. As this radial movement is comparatively slight, there is sufficient spring in the metal of the piston where the segments merge into the head to enable this movement to take place. One or more piston rings are located in peripheral grooves formed in the body of the piston at the head or that portion not divided into the segments. Thus a tight fit is maintained at both ends of the piston with the cylinder walls.

In the construction illustrated, the piston head 4 presents the usual flat end surface 5.

Piston ring grooves 6 are provided in the periphery to receive the usual piston rings 7, herein shown as three in number. These piston rings, as usual, are split and provided with overlapping ends 8, so that the piston rings are free to expand into contact with the cylinder wall.

The cylindrical wall, or in this case the skirt of the piston body, is integral with the head. This skirt is divided by axially inclined cuts 9 into a plurality of, herein shown as three in number, similar segments 10. The cuts 9 preferably terminate in drill holes 11 to prevent splitting of the metal. These segments 10 may be expanded and contracted radially to produce the required fit with the cylinder wall, the metal of the segments springing for that purpose adjacent their integral connection with the head of the piston body. In the construction illustrated, an expansion ring 12 is provided seated in a circumferential groove 13 in the inner face of the segments near their free ends. This ring has its free ends bent inwardly at 14. An expanding screw 15 is threaded into one end 14 and abuts against the other end 14 and is provided with a lock nut 16. One portion of this screw is provided with a polygonal head 17 to receive a wrench. Thus by turning the screw 15, the ring 12 may be expanded to force the ends of the segments of the skirt into close bearing engagement with the cylinder wall. The ring 12 is prevented from moving rotarily with respect to the skirt by a projection shown as a stud 18 riveted into the segment and projecting between the free ends of the ring.

It will be noted that the screw 15 which acts to adjust the circumferential length of the ring 12 is mounted on the free ends of the ring at a substantial distance from the body of the ring. This is important because it permits the ring to contract slightly under an extreme pressure exerted radially inward on the segments. This allows for such a contraction and expansion as result from heat and other causes and enables the free ends of the segments to adapt themselves automatically to changing conditions in the cylinder, while at the same time being held with a proper bearing fit against the cylinder wall, a proper working fit is thus maintained between the piston skirt and cylinder under all conditions. By the term working fit as found in the claims is meant a contact of the skirt with the cylinder wall. Such contact being of a nature to permit a free movement of the piston in the cylinder and at no time permitting clearance to exist therebetween.

An ordinary form of piston rod 19 is shown connected to a wrist pin 20 and having bearings at 21 in the skirt of the piston.

It is intended that the piston diameter at the free end of the skirt shall be a trifle greater than the cylinder diameter so that when the piston is placed in the cylinder the skirt will be contracted slightly, thus nearly closing the cuts 9. But these cuts are sufficient, particularly where they pass through the relieved zone 22 of the piston wall, to allow oil splashed from the interior of the piston to enter the pocket formed between the zone 22 and the cylinder wall and thus provide proper lubrication between the piston and cylinder.

Thus it will be seen that, regardless of the metal of which the piston is made, the construction thus provided with the radial adjustment of the free ends of the segments enables a snug fit between the piston and the cylinder wall to be maintained, thus preventing piston "slap" and insuring even wear between the piston and cylinder and the maintenance of the cylindrical shape of the cylinder walls.

A further feature of the invention resides in providing a piston construction of light weight by forming the body of the piston of aluminum and at the same time obviating the objection to wear which takes place when such a light and soft metal is employed by embedding in the piston body one or more hard metal rings which with the usual piston rings shall present hard bearing surfaces between the piston and cylinder. Such a piston is herein disclosed as of a construction embodying also the features of the invention already set forth.

As shown in Figs. 4 and 5, such a piston comprises the solid head 23 and integral therewith the cylindrical skirt divided by the inclined cuts 24 into a plurality, herein shown as three in number, of similar segments 25. This piston body is formed by a casting of aluminum and the walls of the piston are preferably thicker than when made of a hard metal such as cast iron. One or more piston rings 26, herein shown as three in number, are of a suitable type and are located in the usual piston ring grooves provided in the piston periphery for that purpose. These piston rings take the wear between the piston and the cylinder wall in that section of the piston in which they are located.

The remaining section of the piston is provided with one or more hard metal rings embedded therein to take the wear between the remaining portion of the piston and the cylinder wall. Any suitable number of such rings may be provided depending upon the length of the piston, but there should be at least one such hard metal ring near the end of the piston opposite the piston rings, or, in the construction illustrated, near the free ends of segments of the piston skirt. In the construction illustrated, two such hard metal rings 27 and 28 are shown, the former near the free ends of the piston segments and the latter intersecting the wrist pin bearing and performing the additional function hereinafter set forth.

The hard metal ring 27 is formed of any suitable hard metal, such, for example, as cast iron. It is embedded in the piston body during the operation of casting the piston. Considering the radial cross section of such a ring as shown in Fig. 4, it will be noted that this section is wider inwardly at a distance from the outer face of the piston than at the outer face, this difference of width in the construction illustrated being formed by the ribs 29. Thus the ring 27 is prevented from moving radially outward with respect to the body. The ring is further locked in place in the aluminum body of the piston by reason of transverse apertures formed in the ring and into which integral portions 30 of the aluminum body extend, these portions flowing into the apertures during the casting operation.

The ring 28 is preferably of a similar construction and similarly held in position in the aluminum body.

After the casting operation is finished, the aluminum body may extend outwardly beyond or around the hard metal ring and the cylindrical periphery of the piston is then finished off by turning, grinding or otherwise to cause the hard metal rings such as 27 and 28 to present their outer peripheral faces flush with, or slightly outwardly of, the outer peripheral face of the piston wall so that the faces of these rings shall form the bearing against the cylinder wall to take the wear between the piston and cylinder. In other words, the piston is preferably cast with a cylindrical body of aluminum of greater diameter than that desired for the piston and this body is cast around the concentrically located hard metal ring. The outer face of this ring may be of a diameter equal to, or preferably slightly greater than the finished diameter desired and the ring is preferably left completely embedded in the aluminum at the end of the casting operation. By the turning or grinding operation, the outer face of the article thus formed is then removed to bring it down to the desired diameter and the outer peripheral face of the hard metal ring is left exposed and of the desired diameter.

There is thus formed a light, strong and durable piston, the weight of the piston depending chiefly upon the light metal, such as aluminum, of which it is mainly formed, and the wearing qualities being dependent upon the hard metal rings embedded in the piston body together with the wearing qualities of the usual piston rings.

In the construction illustrated, in Figs. 4 and 5 wherein the piston skirt is split into segments, a similar construction to that already described in connection with Figs. 1 to 3, inclusive, is provided for effecting the radial expansion of the free ends of the segments so as to maintain at all times an even wearing contact between the end of the piston opposite that where the piston rings are located and the cylinder wall. As shown, a split expansion ring 31 having an expanding screw 32, all of a similar construction to that previously described, is located in a groove in the inner peripheral wall of the piston skirt near the free ends of the segments. Preferably this ring is concentric with the hard metal ring 27.

When, as illustrated, a hard metal ring such as 28 is embedded in the piston wall near the piston head, it is preferably located as shown so as to intersect the bearings or alined bores 33 for the wrist pin. Thus these bores extend into, but not through, the entire depth of this hard metal ring 28. Consequently the pressure between the piston body and wrist pin is taken directly by the hard metal ring 28 when the expansion takes place against the piston head.

It will be understood that this construction of a piston having an aluminum body with one or more hard metal rings embedded therein to take the wear between the piston and cylinder is not in any way to be limited to the specific construction shown in Figs. 4 and 5, wherein the skirt of the piston is split and provided with an expanding means such as the ring 31.

It is to be understood that the term "aluminum" as used herein and in the claims includes the metal usually known by that name and any similar light weight relatively soft metal or alloy which may be cast and is suitable for piston construction.

Having thus described the invention, what is claimed as new, and desired to be secured by Letters Patent, is:

1. A piston comprising a solid aluminum head, a cylindrical aluminum skirt integral with the head, a hard metal ring embedded concentrically in the cylindrical skirt near its free end with the outer peripheral face of the hard metal ring flush with, or outwardly of, the outer peripheral face of the skirt, the said skirt with the embedded ring being divided into a plurality of segments, and means carried by the segments near the ends opposite the head for adjusting said ends radially, the said segments springing adjacent the head upon radial movement of the ends opposite the head.

2. A piston comprising a solid aluminum head, a cylindrical aluminum skirt integral with the head, a hard metal ring embedded concentrically in the cylindrical skirt near its free end with its outer peripheral face flush with, or outwardly of, the outer peripheral face of the skirt, the said skirt and embedded ring being divided into a plurality of at least three substantially equal segments, a split ring carried by the segments at the interior thereof near the ends opposite the head, and resilient means for adjusting the circumferential length of the split ring and thereby for adjusting radially the segment ends opposite the head, the said segments springing adjacent the head upon radial movement of the ends opposite the head.

3. A piston comprising a solid head, a cylindrical skirt integral therewith and divided into a plurality of yieldable segments continuously contacting with their cooperating cylinder, a resilient split ring within the lower portion of said skirt and continuously engaging said segments throughout their entire width and having inwardly bent end portions, and adjustable means engaging said end portions at a distance from the periphery of said ring operable to place the ring under such tension as to maintain a desired working fit of said skirt and cylinder, said end portions being of such resilience as to maintain substantially the same working fit irrespective of variations in expansion of said cylinder and piston at different temperatures.

4. A piston comprising a solid head, a cylindrical skirt integral therewith and divided into a plurality of yieldable segments, said skirt continuously fitting its cooperating cylinder with a working contact throughout its entire circumference when both are at the same temperature, a split ring within and continuously in engagement with said segments throughout their entire width and having inwardly projecting resilient end portions, and means mounted on said end portions at a substantial distance from the periphery of the ring operable by engagement with said end portions to change the circumferential length of said ring thereby to expand said skirt under sufficient tension to insure continuous working contact of the skirt with the cylinder wall regardless of different rates of expansion therebetween due to changes of temperature.

In testimony whereof, I have signed my name to this specification.

LESLIE J. THOMAS.